UNITED STATES PATENT OFFICE.

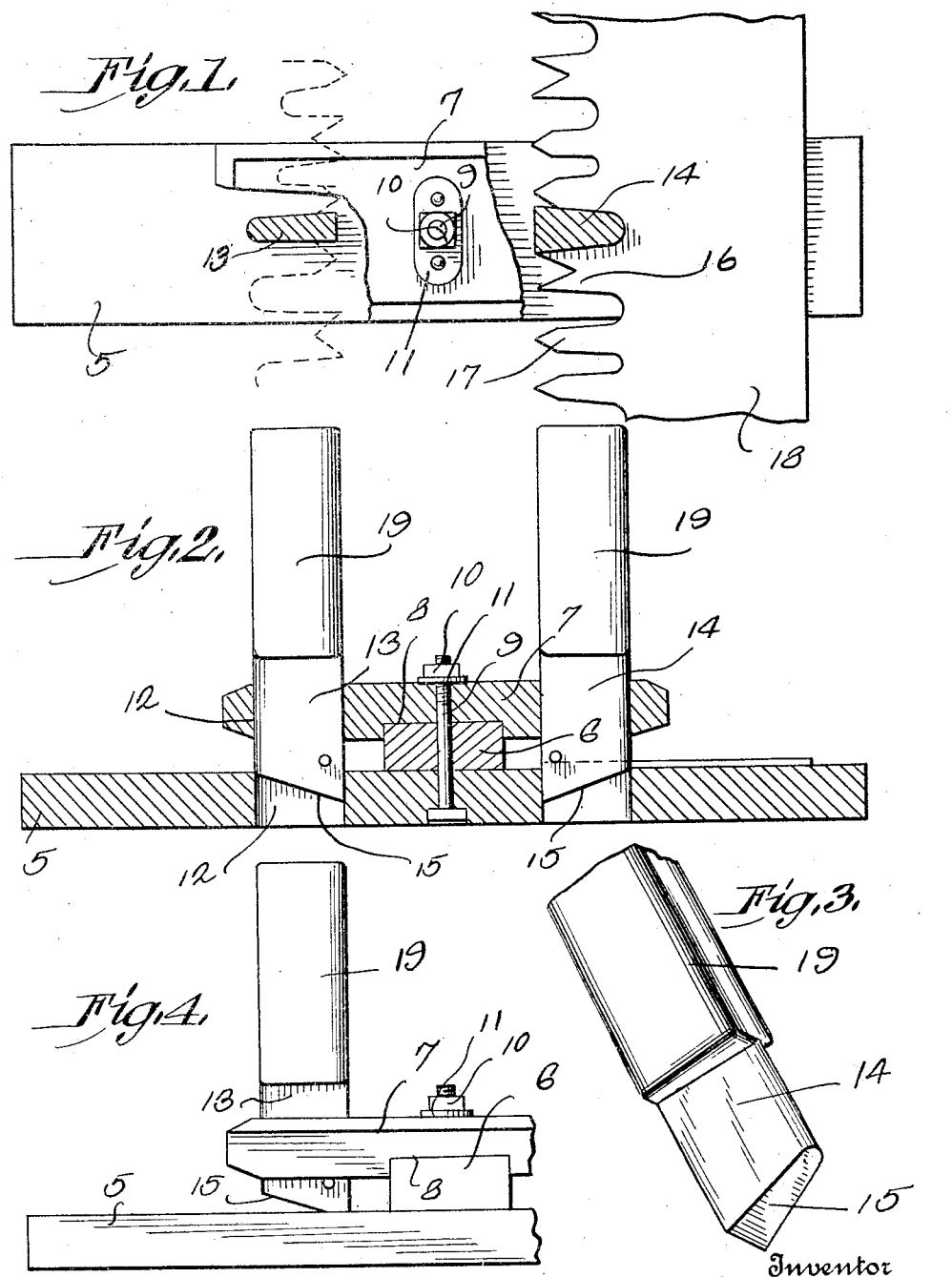

JOHN MILES, OF ONTONAGON, MICHIGAN.

SAW-GUMMER.

1,336,042.   Specification of Letters Patent.   Patented Apr. 6, 1920.

Application filed July 16, 1918. Serial No. 245,169.

*To all whom it may concern:*

Be it known that I, JOHN MILES, a citizen of the United States, residing at Ontonagon, in the county of Ontonagon, State of Michigan, have invented certain new and useful Improvements in Saw-Gummers; and I do hereby declare the following to be a full, clear, and exact description of the invention, such as will enable others skilled in the art to which it appertains to make and use the same.

The invention relates to a cross cut saw gumming appliance, and has for its primary object to provide a device of this character, wherein the teeth and rakers of a saw can be cut for the lengthening thereof without the necessity of filing the teeth and rakers or the use of an emery wheel, as usual, the appliance being constructed so that the same can be readily knocked down to render it compact for the storage and carriage thereof in a saw kit.

Another object of the invention is the provision of an appliance of this character, wherein the construction thereof is novel in form so that the same is handy and readily used when the occcasion requires, as it is portable for the convenient carriage thereof by the user of the saw and thereby enabling its use for the lengthening of the teeth and rakers of the saw at the point of execution of work, and thus eliminating the transportation of the saw to and from a work shop or place where the gumming of the saw is to be cared for in the usual manner by the filing or gumming operation with an emery wheel.

A further object of the invention is the provision of an appliance of this character, which is extremely simple in construction to permit the lengthening of both the teeth and the rakers of the saw without excessive labor on the part of the operator of the appliance, readily portable, thoroughly reliable and efficient in its purpose, and inexpensive to manufacture.

With these and other objects in view, the invention consists in the features of construction, combination and arrangement of parts as will be hereinafter fully described, illustrated in the accompanying drawing and pointed out in the claim hereunto appended.

In the accompanying drawing:

Figure 1, is a top plan view of the appliance constructed in accordance with the invention showing a portion thereof broken away with a saw blade in position for the lengthening of its teeth.

Fig. 2, is a vertical longitudinal sectional view.

Fig. 3, is a perspective view of one of the cutters or die members.

Fig. 4, is an elevation, a portion thereof being broken away.

Similar reference characters indicate corresponding parts throughout the several views in the drawing.

Referring to the drawing in detail, the appliance comprises a base 5 preferably in the form of a rectangular plate constituting an anvil having a medial thickened or raised portion or block 6 serving as a vertical spacer for a detachable guide head 7, the under face of which is provided with a medial transverse recess forming a counter-seat 8 for the thickened portion or block 6, the head 7 being detachably fastened thereto through the medium of a bolt 9 having the usual adjustable nut 10, which bolt is passed upwardly through the base plate 5, thickened portion 6 and the head 7 centrally thereof, while the nut 10 is worked against a washer or wear plate 11 surrounding the bolt 9 and suitably secured upon the top face of the head.

Formed in the base plate and the head on opposite sides of the thickened portion 6 are die ways 12, which vertically register with each other and are correspondingly shaped. Vertically movable in the ways or openings 12 are the respective cutter dies 13 and 14 which are inwardly beveled at their ends at 15 to form shear cutting tips, and these dies are shaped to correspond to the furcations or spaces between the rakers 16 and teeth 17, and also between two teeth 17 of the saw 18, so that the rakers and teeth can be lengthened as required.

The cutter dies 13 and 14 are formed with handles 19 which are adapted to be struck by a hammer or other tool or implement for imparting a sudden and forcible blow thereto, so that the cutting tip 15 of each die will cut the blade 18 for the lengthening of the rakers and teeth of the saw.

In the use of the appliance, the saw blade 18 is inserted between the anvil and the head so that the blade will rest upon the anvil 5 at one side of the thickened portion 6, and the space between the rakers and teeth is brought into position to aline with the path of movement of the cutter die on that particular side of the appliance. Said die is normally raised, and on imparting a blow upon the same it cuts the blade and thus lengthens the rakers of the saw, and this operation is repeated for the lengthening of all the rakers or the required number on said saw. Thereafter the blade 18 of the saw is shifted to the other side of the appliance and the other cutter die is operated in a like manner between the teeth 17 of said saw for the lengthening of the teeth, and in this manner the gumming of cross cut saws is perfected.

When the appliance is not in use, the cutter dies can be removed from the head and the latter detached from the anvil.

From the foregoing it is thought that the construction and manner of use of the appliance will be clearly understood and therefore a more extended explanation has been omitted.

What is claimed is:

In an appliance of the character described, an anvil having two die-sockets, a raised portion between them, a head on the raised portion and having guides overhanging the sockets, cutting dies slidable through the guides at opposite sides of the raised portion and coacting with the sockets for lengthening the rakes and teeth of a cross cut saw, and handles on said cutting dies adapted to receive a blow for the cutting operation of said dies.

In testimony whereof I affix my signature, in the presence of two witnesses.

JOHN MILES.

Witnesses:
CYRUS SPELLMAN,
A. J. SCOVIA.